(12) United States Patent
McCarthy et al.

(10) Patent No.: US 8,905,460 B2
(45) Date of Patent: Dec. 9, 2014

(54) BALLISTIC TRANSPARENCY

(75) Inventors: Dennis P. McCarthy, Owens Crossroads, AL (US); John R. Miller, Huntsville, AL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 821 days.

(21) Appl. No.: 12/391,715

(22) Filed: Feb. 24, 2009

(65) Prior Publication Data

US 2012/0175908 A1    Jul. 12, 2012

Related U.S. Application Data

(60) Provisional application No. 61/031,081, filed on Feb. 25, 2008.

(51) Int. Cl.

| | |
|---|---|
| *F41H 5/26* | (2006.01) |
| *B32B 17/06* | (2006.01) |
| *B32B 17/10* | (2006.01) |
| *F41H 5/04* | (2006.01) |
| *F41H 7/04* | (2006.01) |

(52) U.S. Cl.
CPC ............ *F41H 5/0407* (2013.01); *F41H 5/263* (2013.01); *F41H 5/26* (2013.01); *B32B 17/10036* (2013.01); *F41H 7/044* (2013.01); *B32B 17/10293* (2013.01); *B32B 17/10761* (2013.01); *B32B 2369/00* (2013.01); *Y10S 428/911* (2013.01)
USPC ............... 296/146.15; 296/187.07; 296/84.1; 52/786.12; 428/911

(58) Field of Classification Search
USPC .................. 296/187.07, 190.1, 146.15, 84.1; 89/36.01, 36.04, 36.08, 36.09; 52/783.1, 785.12, 786.11, 786.12, 52/796.1; 428/911
See application file for complete search history.

(56) References Cited

U.S. PATENT DOCUMENTS

| | | | |
|---|---|---|---|
| 3,762,988 A | 10/1973 | Clock et al. | .................. 161/183 |
| 3,843,193 A | 10/1974 | Krings et al. | |
| 3,953,630 A | 4/1976 | Roberts et al. | |
| 4,287,107 A | 9/1981 | Hermann et al. | ............ 260/28.5 |

(Continued)

FOREIGN PATENT DOCUMENTS

| | | |
|---|---|---|
| DE | 37 29 870 C1 | 10/1988 |
| EP | 0 376 190 A2 | 7/1990 |

(Continued)

OTHER PUBLICATIONS

English translation of WO 2007/042716, retreived Aug. 28, 2013 from the European Patent Office website via Patenttranslate, located at http://worldwide.espacenet.com/publicationDetails/description?CC=WO&NR=2007042716A1&KC=A1&FT=D&ND=3&date=20070419&DB=EPODOC&locale=en_EP.*

(Continued)

*Primary Examiner* — Glenn Dayoan
*Assistant Examiner* — Jason S Daniels
(74) *Attorney, Agent, or Firm* — Andrew C. Siminerio

(57) ABSTRACT

A ballistic transparency includes a first ply having a peripheral edge; a second ply spaced from the first ply and having a peripheral edge; a polymeric layer located between the first ply and the second ply; and at least one flexible mounting member having a first end extending within the polymeric layer and a second end extending beyond the peripheral edges of the first and second plies.

9 Claims, 3 Drawing Sheets

(56) References Cited

U.S. PATENT DOCUMENTS

| | | | |
|---|---|---|---|
| 4,746,347 A | 5/1988 | Sensi | 65/94 |
| 4,792,536 A | 12/1988 | Pecoraro et al. | 501/70 |
| 5,030,593 A | 7/1991 | Heithoff | 501/72 |
| 5,030,594 A | 7/1991 | Heithoff | 501/72 |
| 5,240,886 A | 8/1993 | Gulotta et al. | 501/70 |
| 5,385,872 A | 1/1995 | Gulotta et al. | 501/71 |
| 5,393,593 A | 2/1995 | Gulotta et al. | 428/220 |
| 5,445,890 A | 8/1995 | Bayha et al. | 428/431 |
| 5,796,055 A | 8/1998 | Benson, Jr. et al. | 181/208 |
| 6,276,100 B1 | 8/2001 | Wöll et al. | 52/204.62 |
| 6,280,826 B1 | 8/2001 | Wöll et al. | 428/192 |
| 6,569,787 B1 * | 5/2003 | Snelling | 442/135 |
| 6,708,595 B1 * | 3/2004 | Chaussade et al. | 89/36.02 |
| 8,153,237 B2 * | 4/2012 | Maeuser et al. | 428/192 |

FOREIGN PATENT DOCUMENTS

| | | |
|---|---|---|
| EP | 0 459 704 A1 | 12/1991 |
| WO | 2005/014964 A1 | 2/2005 |
| WO | WO 2007042716 A1 * | 4/2007 |

OTHER PUBLICATIONS

Enhlish translation of WO 2007/042716, retreived Feb. 25, 2014 from the European Patent Office via Patenttranslate located at http://translationportal.epo.org/emtp/translate/?ACTION=description-retrieval&COUNTRY=WO&ENGINE=google&FORMAT=docdb&KIND=A1&LOCALE=en_EP&NUMBER=2007042716&OPS=ops.epo.org&SRCLANG=fr&TRGLANG=en.*

International Search Report, PCT/US2009/036110, dated Nov. 26, 2009.

* cited by examiner

BALLISTIC TRANSPARENCY

CROSS-REFERENCE TO RELATED APPLICATIONS

This application claims priority to U.S. Provisional Application No. 61/031,081, filed on Feb. 25, 2008, which is herein incorporated by reference in its entirety.

BACKGROUND OF THE INVENTION

1. Field of the Invention

This invention relates generally to ballistic transparencies and, in one particular embodiment, to a ballistic transparency particularly useful as a bullet proof or explosion proof vehicle transparency. This invention also relates to a method of securing a ballistic transparency to a frame.

2. Technical Considerations

Ballistic transparencies have long been used for protecting the occupants of vehicles while at the same time allowing the vehicle occupants to see out of the vehicle. Ballistic transparencies, commonly referred to as "bullet proof" or "explosion proof" windows, are widely used on military vehicles and security vehicles. Conventional ballistic transparencies typically take the form of glass and/or plastic panes bonded together to form a laminated structure.

Various methods are known for mounting a ballistic transparency to a vehicle. For example, in one known method, the ballistic transparency is placed inside a specially fabricated metal casement and the casement is attached to the vehicle. However, a problem with this method is that it is difficult and time consuming to mount the transparency in the casement. Also, it is difficult to remove or replace the transparency.

In another known method, the peripheral edge of one of the glass panes of the laminate extends beyond the other panes, thus forming a projection or "lip" which can be engaged with a conventional vehicle window frame so that no specially fabricated frames or casements are required to mount the transparency in the vehicle. While this mounting method provides advantages over the casement method, a problem with this method is that under extreme loading, such as caused by severe explosive detonations and/or high velocity projectile impacts to the transparency, the projecting lip of the transparency holding the transparency in the frame can break or crack. In a worst case scenario, this can cause the transparency to partly or completely detach from the frame, subjecting the vehicle occupants to the danger of bullets or other objects entering the vehicle through the resultant opening.

Therefore, it would be advantageous to provide a ballistic transparency and a method of mounting a ballistic transparency to a frame which eliminate or reduce at least some of the problems associated with known ballistic transparencies.

SUMMARY OF THE INVENTION

A ballistic transparency comprises a first ply having a peripheral edge; a second ply spaced from the first ply and having a peripheral edge; a polymeric layer located between the first ply and the second ply; and at least one flexible mounting member having a first end extending within the polymeric layer and a second end extending beyond the peripheral edges of the first and second plies.

Another ballistic transparency comprises an outer glass ply; an inner glass ply; a first interlayer ply positioned between the inner and outer glass plies to bond the glass plies together; a polycarbonate ply; a second interlayer ply positioned between the inner glass ply and the polycarbonate ply to bond the inner glass ply and polycarbonate ply together; and at least one flexible mounting member having a first portion positioned and laminated between the inner and outer glass plies and a second portion extending beyond the periphery of the transparency, wherein the flexible mounting member is a woven wire cloth.

A ballistic transparency assembly comprises a ballistic transparency, comprising: a first ply having a peripheral edge; a second ply spaced from the first ply and having a peripheral edge, wherein the peripheral edge of the first ply extends beyond the peripheral edge of the second ply to form a projection; a polymeric layer located between the first ply and the second ply; and at least one flexible mounting member having a first end extending within the polymeric layer and a second end extending beyond the peripheral edges of the first and second plies. The assembly also includes a frame having an engagement element, wherein the projection of the first ply engages the engagement element of the frame and wherein the second end of the flexible member is connected to the frame.

A vehicle of the invention has a ballistic transparency of the invention, such as a windshield, secured at least partly to an opening in the vehicle by bolts extending through the second portion of the flexible member.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
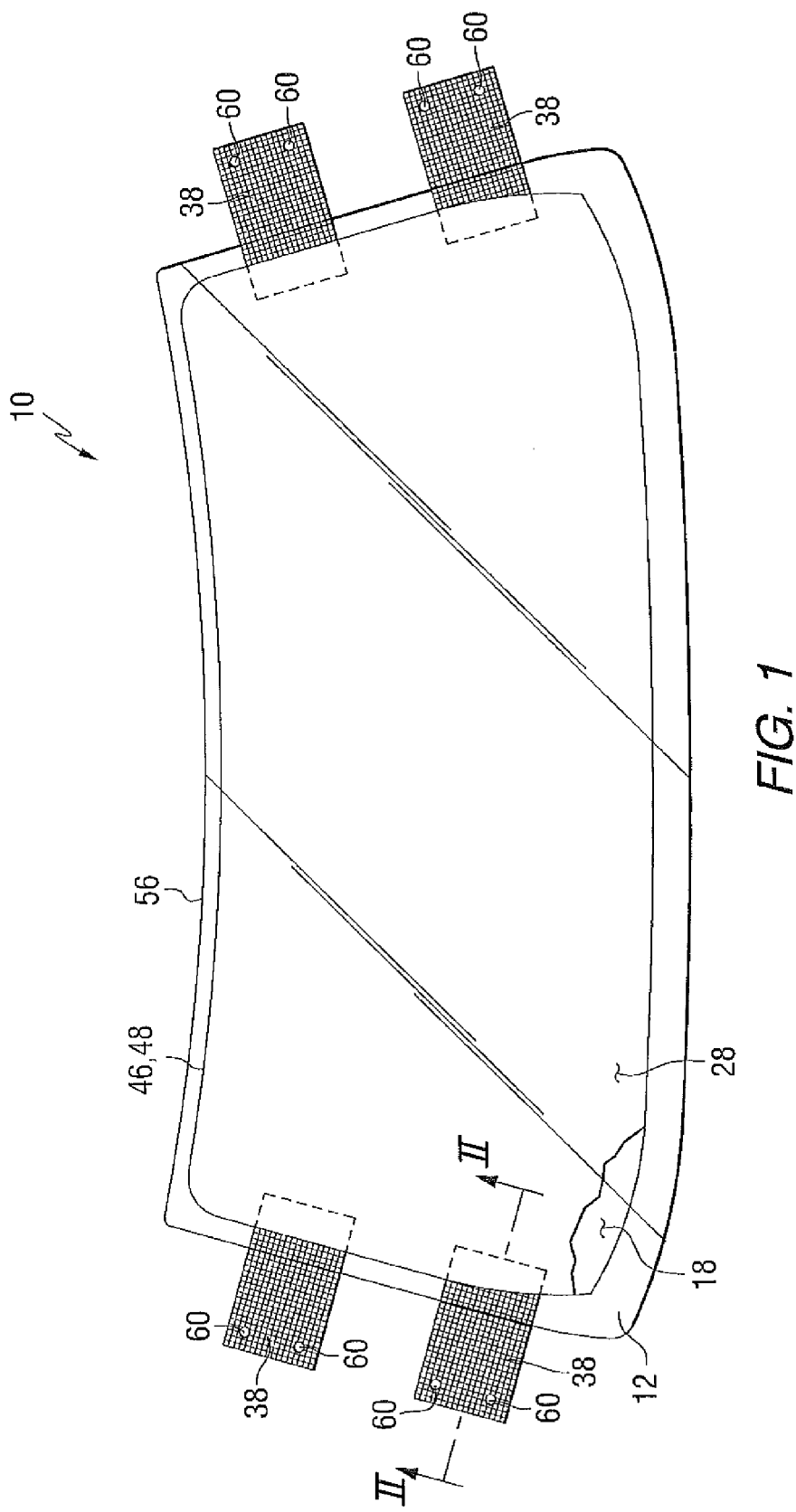
FIG. 1 is a plan view (not to scale) of a ballistic transparency incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all sub ranges subsumed therein. For example, a stated range of "1 to 10" should be considered to include any and all sub ranges between (and inclusive of) the minimum value of 1 and the maximum value of 10; that is, all sub ranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in direct contact with the underlying surface. For example, a layer "formed over" a substrate does not preclude the presence of one or more other layers of the same or different composition located between the formed layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 780 nm. The terms "infrared region" or "infrared radiation" refer to electromagnetic radiation having a wavelength in the range of greater than 780 nm to 100,000 nm. The terms "ultraviolet region" or "ultraviolet radiation" mean electromagnetic energy having a wavelength in the range of 100 nm to less than 380 nm. Additionally, all documents, such as but not limited to issued patents and patent applications, referred to herein are to be considered to be "incorporated by reference" in their entirety.

For purposes of the following discussion, the invention will be discussed with reference to an exemplary non-limiting ballistic transparency in the form of a vehicle transparency, such as a vehicle windshield, mounted to a vehicle frame. However, it is to be understood that the invention is not limited to use with vehicle transparencies but could be practiced with articles in other fields, such as but not limited to residential and/or commercial building windows, insulating glass units, curtain walls, storefronts and/or transparencies for land, air, space, above water and underwater vehicles, e.g., automotive windshields, sidelights, back lights, sunroofs, and moon roofs, just to name a few. Therefore, it is to be understood that the specifically disclosed exemplary embodiments are presented simply to explain the general concepts of the invention but that the invention is not limited to these specific exemplary embodiments.

As discussed below, the ballistic transparency of the invention is a laminated structure having a plurality of protective plies, such as but not limited to glass and/or polymeric plies, laminated together to form the ballistic transparency. The number and/or type of plies used can vary greatly depending upon the desired use of the ballistic transparency. As a general rule, the thicker the protective plies, the more protection will be afforded but the heavier the transparency will be. In the exemplary non-limiting embodiment illustrated in FIGS. 1 and 2, the ballistic transparency 10 includes a first protective ply 12 (outer ply) having a first major surface 14 designed to face the vehicle exterior, i.e., an outer major surface, and a second major surface 16 facing the vehicle interior, i.e., an inner major surface. A second protective ply 18 is spaced from the first ply 12 and has an outer major surface 20 and an inner major surface 22. The first ply 12 and second ply 18 are secured together by an adhesive material, e.g., a first adhesive interlayer 24. A third ply 28 is spaced from the second ply 18 and has an outer major surface 30 and an inner major surface 32. The third ply 28 is secured to the second ply 18 by an adhesive material, e.g., a second adhesive interlayer 34. In one aspect of the invention, at least one peripheral reinforcement and mounting member of the invention, e.g., a flexible attachment or mounting member 38, is connected to or attached to the ballistic transparency 10. The flexible member 38 extends beyond the outer periphery of the transparency 10 and provides a means for securing the transparency 10 to a surrounding structure or frame and/or a means for reinforcing the attachment of the ballistic transparency 10 to the frame. The ballistic transparency 10 can include an opaque border 40 around at least a portion of the transparency perimeter. The ballistic transparency 10 can also include a polymeric sealant applied on the peripheral edges of the transparency 10.

In the broad practice of the invention, the plies 12, 18 and/or 28 can include any desired material having any desired characteristics. For example, one or more of the plies can be transparent or translucent to visible light. By "transparent" is meant having a transmission of greater than 0% up to 100% in a desired wavelength range, such as visible light. Alternatively, one or more of the plies can be translucent. By "translucent" is meant allowing electromagnetic radiation (e.g., visible light) to be transmitted but diffusing or scattering this radiation. Examples of suitable materials for the plies include, but are not limited to, thermoplastic, thermoset, or elastomeric polymeric materials, glasses, ceramics, and combinations, composites, or mixtures thereof. Specific examples of suitable materials include, but are not limited to, plastic substrates (for example, acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered, bent, heat strengthened, or laminated. The glass can be of any type, such as conventional float glass, and can be of any composition having any optical properties, e.g., any value of visible transmission, ultraviolet transmission, infrared transmission, and/or total solar energy transmission. One or more of the plies can be, for example, clear float glass or can be tinted or colored glass. Although not limiting to the invention, examples of glass suitable for one or more of the plies are described in U.S. Pat. Nos. 4,746,347; 4,792,536; 5,030,593; 5,030,594; 5,240,886; 5,385,872; and 5,393,593. The plies 12, 18 and/or 28 can be of any desired dimensions, e.g., length, width, shape, or thickness. Non-limiting examples of glass that can be used for the practice of the invention include, but are not limited to, Starphire®, Solarphire®, Solarphire® PV, Solargreen®, Solextra®, GL-20®, GL-35™, Solarbronze®, CLEAR, and Solargray® glass, all commercially available from PPG Industries Inc. of Pittsburgh, Pa.

Figure 2:
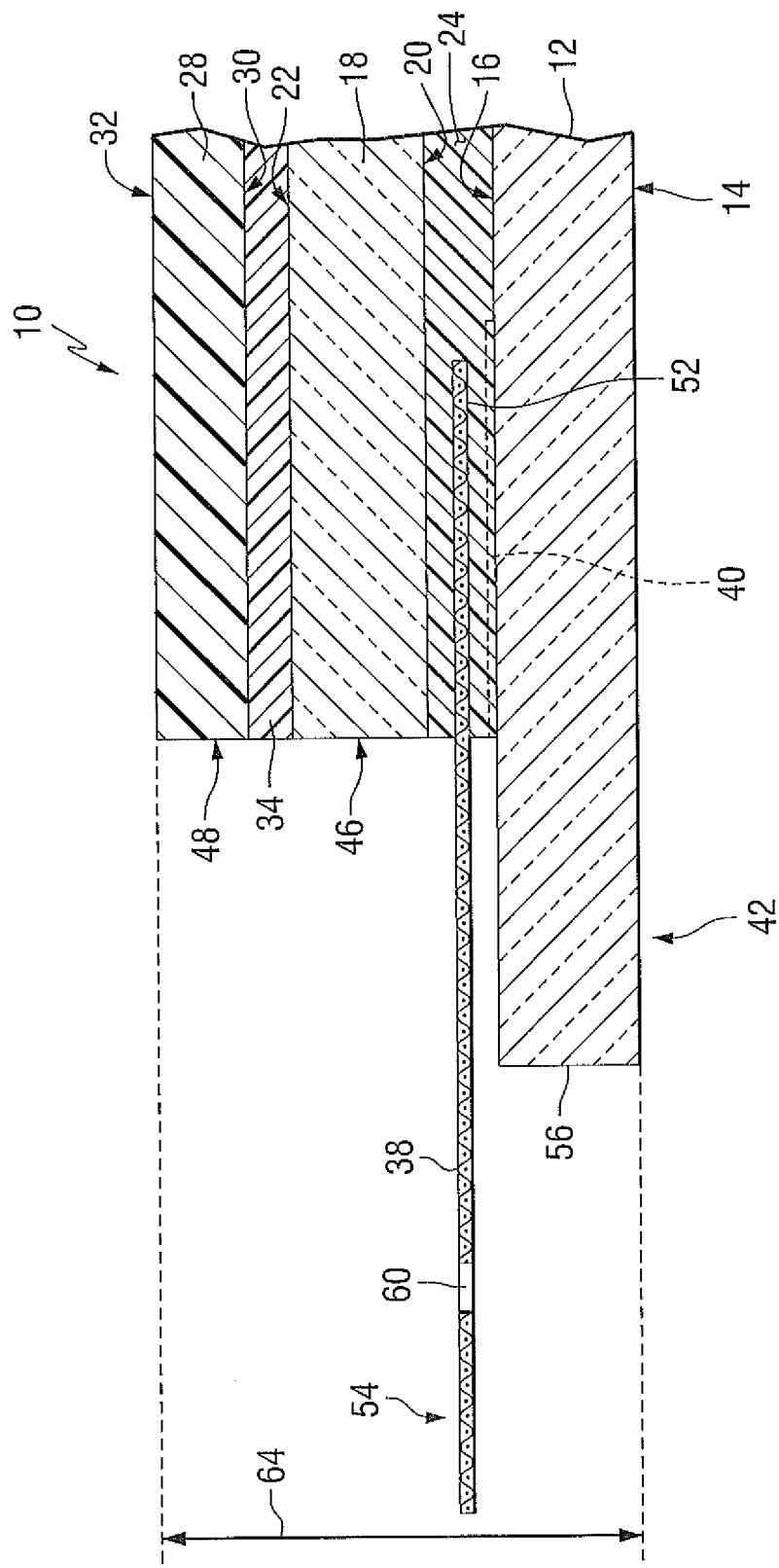
FIG. 2 is a side, sectional view (not to scale) of the ballistic transparency of FIG. 1 taken along the line II-II of FIG. 1.

In the illustrated non-limiting embodiment, the first ply 12 is a glass ply (outer glass ply). The glass can be conventional float glass or can be annealed or heat strengthened (e.g., tempered) glass. As shown in FIG. 2, the outer glass ply 12 forms a projection 42 defined by a peripheral portion of the first ply 12 that extends beyond the peripheral edges 46 and 48 of the other plies 18 and 28, respectively. This projection 42 enables the ballistic transparency 10 to be engaged with an engagement element of a structure, such as the frame of a conventional vehicle window system, as will be described in more detail below. In one particular non-limiting embodiment, the first ply 12 has a thickness in the range of 0.1 inch to 4 inches (0.25-10 cm), such as 0.1 inch to 3 inches (0.25-7.5 cm), such as 0.1 inch to 2 inches (0.25-5 cm), such as 0.5 inch to 2 inches (1.25-5 cm), such as 0.5 inch to 1.5 inches (1.25-3.75 cm), such as 0.5 inch to 1 inch (1.25-2.5 cm).

In the illustrated non-limiting embodiment, the second ply 18 is also a glass ply (inner glass ply). The glass can be conventional float glass or can be annealed or heat strengthened (e.g., tempered) glass. In one particular non-limiting embodiment, the second ply 18 has a thickness in the range of 0.1 inch to 4 inches (0.25-10 cm), such as 0.1 inch to 3 inches (0.25-7.5 cm), such as 0.1 inch to 2 inches (0.25-5 cm), such as 0.5 inch to 2 inches (1.25-5 cm), such as 0.5 inch to 1.5 inches (1.25-3.75 cm), such as 0.5 inch to 1 inch (1.25-2.5 cm). The first ply 12 and second ply 18 can be the same or different thickness and can be of the same or different type of glass.

In the illustrated non-limiting embodiment, the third ply 28 (inner ply) comprises a polymeric material, which can be any of the polymeric materials described above. In one particular non-limiting embodiment, the third ply 28 is a polycarbonate ply. In one non-limiting embodiment, the third ply can have a thickness in the range of 0.1 inch to 1 inch (0.25-2.5 cm), such as 0.125 inch to 0.75 inch (0.3-1.8 cm), such as 0.125 inch to 0.5 inch (0.3-1.25 cm), such as 0.125 inch to 0.25 inch (0.3-0.6 cm).

As described above, the plies 12, 18, 28 are secured together by adhesive material, e.g., interlayers 24 and 34. The interlayers 24, 34 can be of any desired material and can include one or more layers. For example, the interlayers 24, 34 can include a polymeric or plastic material, such as, for example, polyvinylbutyral, plasticized polyvinyl chloride, or multi-layered thermoplastic materials such as polyethyleneterephthalate, etc. Suitable interlayer materials are disclosed, for example but not to be considered as limiting, in U.S. Pat. Nos. 4,287,107 and 3,762,988. The interlayers 24, 34 secure the plies 12, 18 and 28 together. Additionally, the interlayers 24, 34 can provide energy absorption, reduce noise, and increase the strength of the laminated structure. The interlayers 24, 34 can also include a sound-absorbing or attenuating material as described, for example, in U.S. Pat. No. 5,796,055. One or both of the interlayers 24, 34 can have a solar control coating provided thereon or incorporated therein or can include a colored material to reduce solar energy transmission.

In one non-limiting embodiment, the first interlayer 24 is polyvinylbutyral and has a thickness in the range of 0.5 mm to 5 mm, such as 0.5 mm to 4 mm, such as 0.5 to 3 mm, such as 0.5 to 2.5 mm, such as 0.5 mm to 1.5 mm, such as 0.75 mm to 1.5 mm, such as 1 mm to 1.5 mm, such as 1.25 mm. The first interlayer 24 and second interlayer 34 can be the same or different thicknesses. In another non-limiting embodiment, the first interlayer 24 can be polyvinylbutyral and can have a thickness in the range of 0.5 mm to 3 mm, such as 1 mm to 3 mm, such as 2 mm to 3 mm, such as 2.3 mm. In one non-limiting embodiment, the first interlayer 24 can be thicker than the second interlayer 34.

In one non-limiting embodiment, the second interlayer 34 is polyvinylbutyral and has a thickness in the range of 0.5 mm to 5 mm, such as 0.5 mm to 4 mm, such as 0.5 to 3 mm, such as 0.5 to 2 mm, such as 0.5 mm to 1.5 mm, such as 0.75 mm to 1.5 mm, such as 1 mm to 1.5 mm, such as 1.25 mm.

In the practice of the invention, at least one flexible mounting member 38 is attached to the ballistic transparency 10. In the embodiment shown in FIG. 1, four separate, spaced-apart flexible mounting members 38 are shown. In the illustrated embodiment, two flexible members 38 are positioned and centered along each A-post of the ballistic transparency 10 at a spaced distance from each other, such as 0.5 inch to 5 inches (1.25-12.5 cm) apart, such as 1 inch to 4 inches (2.5-10 cm), such as 1 inch to 3 inches (2.57-5 cm), such as 1 inch to 2 inches (2.5-5 cm), such as 1.5 inches apart (3.75 cm). As shown in FIG. 2, an inner end 52 of the flexible mounting member 38 is secured to or incorporated into one of the interlayers, for example the first interlayer 24. An outer end 54 of the flexible mounting member 38 extends beyond the peripheral edge 56 of the outer ply 12. In one particular non-limiting embodiment, the inner end 52 of the flexible mounting member 38 extends at least 0.5 inch (1.25 cm) into the first interlayer 24, such as at least 0.75 inch (1.8 cm), such as at least 1 inch (2.5 cm), such as at least 1.5 inch (3.75 cm), such as at least 2 inches (5 cm), such as at least 2.5 inches (6.25 cm), such as at least 2.75 inches (6.9 cm), such as in the range of 0.5 inch to 3 inches (1.25-7.5 cm). The distance the inner end 52 extends into the laminate, e.g., first interlayer 24, can vary depending upon the desired level of protection. As a general rule, the farther the inner end 52 extends into the laminate, the stronger will be the attachment of the transparency 10 to the surrounding frame. It is desirable that the inner end 52 of the flexible member 38 not extend too deeply into the interlayer 24 that it unduly reduces or otherwise adversely impacts upon the vision area of the transparency 10. The outer end 54 of the flexible mounting member 38 extends a sufficient distance to allow at least a portion of the flexible member 38 to be wound around or at least in contact with a portion of the frame. In one non-limiting embodiment, the outer end 54 at least 0.5 inch (1.25 cm) beyond the peripheral edge 56 of the outer ply 12, such as at least 1 inch (2.5 cm), such as at least 1.5 inch (3.75 cm), such as at least 2 inches (5 cm), such as at least 3 inches (7.5 cm), such as at least 4 inches (10 cm), such as at least 5 inches (12.5 cm), such as in the range of 4.5 inches to 5 inches (11.25-12.5 cm).

The flexible mounting member 38 can be made of any flexible material having sufficient strength and integrity to secure the ballistic transparency 10 to the vehicle frame. By "flexible" is meant a material that is capable of being easily bent or flexed without damage or breaking. Non-limiting examples of flexible material suitable for the flexible member 38 include, but are not limited to, wire mesh or woven wire cloth. As used herein, the term "wire cloth" refers to an article comprising metal wires woven or knitted into a gird or screen pattern with openings determined by the mesh size or linear density of the wires (wires per inch). Wire mesh products useful for the practice of the invention include, but are not limited to, weave and knit styles, wire diameters and types of materials. Common weave styles for wire mesh and cloth include plain weave, twill, and plain Dutch, as well as variants. Wire diameter and mesh size can vary. For example, in one non-limiting embodiment the wire size can vary from 0.007 inch to 0.375 inch (0.02-0.9 cm) in diameter and the mesh (the number of openings per lineal inch) can vary from 4 to 38. The weave pattern can provide different shaped openings, such as square (i.e., the mesh is the same length in both the x and y directions), rectangular (i.e., the mesh differs in the x and y directions) or diamond shaped, just to name a few. In addition, and without limiting the present invention, metals that can be used for the wires include stainless steel, aluminum, copper, brass, bronze, titanium, nickel, molybdenum, tantalum, tungsten and alloys of these materials. In another embodiment, fibrous materials can be used for the flexible member rather than metal materials. Examples of suitable fibrous materials include, but are not limited to, Kevlar®, aramid, or high strength fiberglass fibers. These materials can include additional coatings to improve their weatherability and service life. Other examples of suitable materials for the flexible member include perforated metal and expanded metal articles.

In one particular non-limiting embodiment, the flexible member 38 is formed of a thirty mesh, square mesh woven wire cloth made of 0.012 inch (0.03 cm) diameter T-304 stainless steel wire material available from Edward J. Darby & Sons, Inc. of Philadelphia, Pa. The flexible members 38 can be of any desired dimensions and can be of the same or different dimensions. In one non-limiting embodiment, the flexible members 38 have a width in the range of 1 inch to 20 inches (2.5-50 cm), such as 2 inches to 15 inches (5-37.5 cm), such as 3 inches to 10 inches (7.5-25 cm), such as 5 inches to 10 inches (12.5-25 cm), such as 6 inches to 9 inches (15-22.5 cm), such as 8 inches (20 cm); and can have a length in the range of 1 inch to 20 inches (2.5-50 cm), such as 2 inches to 15 inches (5-37.5 cm), such as 5 inches to 15 inches (12.5-37.5 cm), such as 6 inches to 15 inches (15-37.5 cm), such as 8 inches to 12 inches (20-30 cm), such as 10 inches (25 cm).

The flexible member 38 can be secured to a surrounding structure or frame in any additional manner. In one non-limiting embodiment, the flexible member 38 can include one or more holes 60 or other fastening members configured to receive a fastening element 62, such as a bolt or screw, to secure the flexible member 38 to the frame, as described in more detail below. Alternatively, the outer end 54 of the flexible member 38 can be secured to a structure or frame by welding or tack welding. In one non-limiting embodiment, the transparency 10 can have a thickness in the range of 1 inch to 5 inches (2.5-12.5 cm), such as 1 inch to 4 inches (2.5-10 cm), such as 1 inch to 3 inches (2.5-7.5 cm).

An opaque border 40, such as a conventional ceramic frit or paint, can be applied to at least one of the glass plies 12, 18 to hide or obscure the inner end 52 of the flexible member 38.

Figure 3:
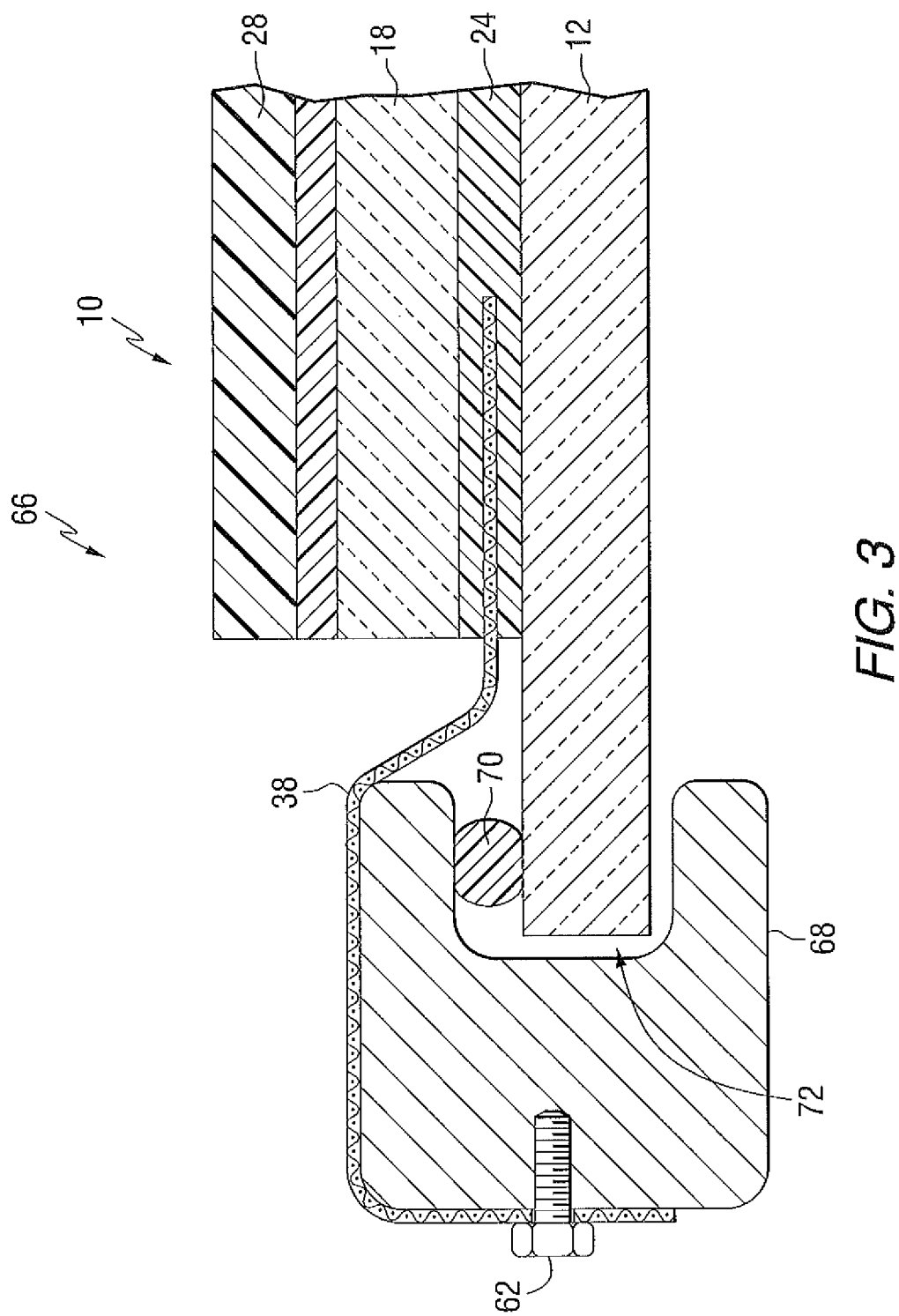
FIG. 3 is a side, sectional view (not to scale) of an edge portion of a ballistic transparency of the invention mounted in a vehicle frame.

A ballistic transparency assembly 66 is shown in FIG. 3. The projection 42 of the outer ply 12 is secured to a structure, such as a frame 68 of a conventional vehicle, such as by securing the projection 42 in an engagement element 72, such as a groove or channel, using a conventional adhesive or sealing strip 70. However, unlike other ballistic transparencies, the ballistic transparency 10 of the invention is also secured to the frame 68 (e.g., one of the vehicle support posts, such as the vehicle A posts) by one or more flexible members 38. In the illustrated embodiment, the outer end 54 of the flexible member 38 is at least partly wound onto or around a portion of the frame 68, such as around at least a portion of the vehicle A post. Fastening elements 62, such as screws, engage the holes 60 in the flexible member 38 to secure the flexible member 38 to the vehicle frame 68. Alternatively, the flexible member 38 can be secured to the frame by welding. Therefore, the ballistic transparency 10 of the invention is secured to the frame 68 not only by a conventional substantially rigid connection (i.e., the conventional adhesive or a conventional sealing strip 70) but also by the flexible member 38, which provides sufficient strength to hold the ballistic transparency 10 in the frame 68 should the protruding portion (projection 42) of the first ply 12 break or crack. The flexible member 38 prevents the ballistic transparency 10 from separating completely from the frame 68 even if the projection 42 completely breaks. That is, should an explosion or other impact be of sufficient force to break or crack the projection 42 of the outer ply, the ballistic transparency 10 will still not be completely dislodged from the frame 68 because it is also secured by one or more flexible members 38. Therefore, the ballistic transparency 10 of the invention provides advantages over prior ballistic transparencies.

A method of making a ballistic transparency 10 of the invention will now be described. The ballistic transparency 10 can be made using conventional laminating techniques well-known in the lamination art, such as those described in U.S. Pat. Nos. 6,280,826; 6,276,100; and 5,445,890. A "sandwich" construction is prepared by placing the plies one on top of the other with one or more conventional polymeric films between the plies. The thickness of the resulting interlayer 24, 34 will depend upon how many of the polymeric films are used. To form the outer interlayer 24, the periphery of one or more of the polymeric film sheets can be trimmed to provide a space into which the inner end 52 of the flexible member 38 can be placed. The sandwich construction can then be heated in a conventional manner to melt the polymeric sheets to form the interlayers 24, 34, with the inner end 52 of the flexible member 38 embedded or enclosed within the outermost interlayer 24.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A ballistic transparency, comprising:
   a first outer glass ply having a peripheral edge;
   a second inner glass ply spaced from the first ply and having a peripheral edge;
   a first polymeric layer located between the first ply and the second ply and having a peripheral edge;
   a polycarbonate ply secured to the second ply by a second polymeric layer, the polycarbonate ply and the second polymeric layer each having a peripheral edge, with the second ply positioned between the polycarbonate ply and the first ply; and
   a plurality of discrete, spaced apart flexible mounting members having a first end extending within the first polymeric layer and a second end extending a sufficient distance to allow at least a portion of the flexible member to be wound around a portion of a vehicle frame,
   wherein the first outer glass ply extends beyond the peripheral edge of the second inner glass ply, the peripheral edge of the polycarbonate ply, and the peripheral edge of the first polymeric layer to form a projection configured to be secured in an engagement element of the vehicle frame by an adhesive or a sealing strip, and wherein the peripheral edge of the first polymeric layer and the peripheral edge of the polycarbonate layer do not extend beyond the peripheral edge of the second inner glass ply.

2. The transparency of claim 1, wherein the polymeric layer comprises polyvinylbutyral.

3. The transparency of claim 1, wherein the flexible mounting member is selected from the group consisting of woven wire cloth, perforated metal flexible mounting members, and expandable metal flexible mounting members.

4. A ballistic transparency, comprising:
   an outer glass ply having a peripheral edge;
   an inner glass ply having a peripheral edge;
   a first interlayer ply positioned between the inner and outer glass plies to bond the glass plies together and having a peripheral edge;
   a polycarbonate ply having a peripheral edge;
   a second interlayer ply positioned between the inner glass ply and the polycarbonate ply to bond the inner glass ply and polycarbonate ply together; and
   at least one flexible mounting member having a first portion positioned and laminated between the inner and outer glass plies and a second portion extending a sufficient distance to allow at least a portion of the flexible member to be wound around a portion of a vehicle frame, wherein the flexible mounting member is selected from the group consisting of woven wire cloth, perforated metal flexible mounting members, and expandable metal flexible mounting members, wherein the peripheral edge of the outer glass ply extends beyond the peripheral edge of the inner glass ply, the peripheral edge of the first interlayer ply, and the peripheral edge of the polycarbonate ply, and wherein the peripheral edge of the first polymeric layer and the peripheral edge of the polycarbonate layer do not extend beyond the peripheral edge of the inner glass ply.

5. The transparency as in claim 4, wherein the flexible mounting member extends around the entire periphery of the transparency.

6. The transparency as in claim 4, including a plurality of discrete, spaced-apart flexible mounting members positioned at predetermined locations about the periphery of the transparency.

7. The transparency as in claim 4, wherein the transparency is a vehicle windshield, back light or side light.

8. The transparency as in claim 4, wherein the transparency is a vehicle windshield, and includes at least two spaced-apart, flexible mounting members positioned along each A-post of the transparency.

9. A ballistic transparency assembly, comprising:
  a ballistic transparency, comprising:
    a first ply having a peripheral edge;
    a second ply spaced from the first ply and having a peripheral edge, wherein the peripheral edge of the first ply extends beyond the peripheral edge of the second ply to form a projection;
    a polymeric layer located between the first ply and the second ply; and
    a polycarbonate ply attached to the second ply and having a peripheral edge; and
    at least one flexible mounting member having a first end extending within the polymeric layer and a second end extending a sufficient distance to allow at least a portion of the flexible member to be wound around a portion of a vehicle frame; and
  the frame having an engagement element, wherein the projection of the first ply is secured to the engagement element of the frame by an adhesive or a sealing strip, and wherein the second end of the flexible mounting member is connected to at least a portion of an exterior surface of the frame, and wherein the peripheral edge of the first ply extends beyond the peripheral edge of the second ply, the peripheral edge of the polymeric layer, and the peripheral edge of the polycarbonate ply, and wherein the peripheral edge of the polymeric layer and the peripheral edge of the polycarbonate ply do not extend beyond the peripheral edge of the second ply.

\* \* \* \* \*